(12) United States Patent
Lin

(10) Patent No.: US 9,317,413 B2
(45) Date of Patent: Apr. 19, 2016

(54) TESTING DEVICE AND TESTING METHOD THEREOF

(71) Applicant: Institute For Information Industry, Taipei (TW)

(72) Inventor: Ching-Wen Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 151 days.

(21) Appl. No.: 14/156,312

(22) Filed: Jan. 15, 2014

(65) Prior Publication Data

US 2015/0135169 A1 May 14, 2015

(30) Foreign Application Priority Data

Nov. 12, 2013 (TW) .............................. 102140949 A

(51) Int. Cl.
*G06F 9/44* (2006.01)
*G06F 3/00* (2006.01)
*G06F 17/40* (2006.01)
*G06F 11/36* (2006.01)

(52) U.S. Cl.
CPC ........ *G06F 11/3688* (2013.01); *G06F 11/3664* (2013.01); *G06F 11/3668* (2013.01); *G06F 11/3692* (2013.01); *G06F 8/38* (2013.01)

(58) Field of Classification Search
CPC ... G06F 8/74; G06F 11/3636; G06F 11/3688; G06F 11/3664; G06F 11/3684; G06F 8/38; G06F 8/30; G06F 11/24; G06F 11/3692; G06F 11/3668; G06F 11/3676
See application file for complete search history.

(56) References Cited

U.S. PATENT DOCUMENTS

2002/0103625 A1* 8/2002 Card ...................... G06F 3/013
702/187
2004/0088602 A1* 5/2004 Cohen ................. G06F 11/3688
714/38.1

(Continued)

FOREIGN PATENT DOCUMENTS

CN 102841845 A 12/2012
TW 201211890 A 3/2012

OTHER PUBLICATIONS

Yike Liu., WCDMA Test Automation Workflow Analysis and Implementation, Apr. 23, 2009, [Retrieved on Dec. 11, 2015]. Retrieved from the internet: <URL: http://www.diva-portal.org/smash/get/diva2:510604/FULLTEXT01.pdf> 50 Pages (1-40).*

(Continued)

*Primary Examiner* — Thuy Dao
*Assistant Examiner* — Anibal Rivera
(74) *Attorney, Agent, or Firm* — Skaar Ulbrich Macari, P.A.

(57) ABSTRACT

A testing device and a testing method thereof are provided. The testing device is connected to a terminal device running a graphical user interface (GUI). The testing device runs a testing program to start a recording procedure to execute the following steps: detecting a plurality of actions generated in response to operations on the terminal device; detecting a foreground application of the GUI; reading a plurality of pieces of object information of the foreground application; and determining the actions to record an object property operation of the foreground application and a call command. The testing device further stops the recording procedure to generate and store a script file and a reference log file. The script file includes the object property operation and the call command.

14 Claims, 7 Drawing Sheets

(56) References Cited

U.S. PATENT DOCUMENTS

| | | | | |
|---|---|---|---|---|
| 2006/0101403 A1* | 5/2006 | Sharma | ............... | G06F 11/3688 717/124 |
| 2006/0294434 A1* | 12/2006 | Ikeda | .................. | G06F 11/3688 714/38.1 |
| 2007/0050676 A1* | 3/2007 | Bae | .................... | G06F 11/3688 714/38.1 |
| 2008/0010543 A1* | 1/2008 | Yamamoto | .......... | G06F 11/3688 714/38.1 |
| 2008/0133175 A1* | 6/2008 | LoBuono | ................ | G06F 11/24 702/182 |
| 2009/0133000 A1* | 5/2009 | Sweis | ................ | G06F 11/3688 717/124 |
| 2009/0199096 A1* | 8/2009 | Pop-Jordanov | ..... | G06F 11/3692 715/704 |
| 2011/0004868 A1* | 1/2011 | Bharadwaj | .......... | G06F 11/3676 717/135 |
| 2011/0131551 A1* | 6/2011 | Amichai | ............. | G06F 11/3668 717/125 |
| 2011/0310041 A1 | 12/2011 | Williams et al. | | |
| 2012/0023485 A1* | 1/2012 | Dubey | ...................... | G06F 8/30 717/125 |
| 2012/0144373 A1* | 6/2012 | Cook | ........................ | G06F 8/38 717/125 |
| 2013/0145217 A1 | 6/2013 | Lin et al. | | |
| 2013/0179865 A1* | 7/2013 | Neumeyer | .......... | G06F 11/3688 717/127 |
| 2013/0290875 A1* | 10/2013 | Dixit | ................... | G06F 11/3664 715/760 |

OTHER PUBLICATIONS

Fabio A. Schreiber et al., Analysis of Data Transmission Performance over a GSM Cellular Network 1997 IEEE, [Retrieved on Dec. 11, 2015]. Retrieved from the internet: <URL: http://ieeexplore.ieee.org/stamp/stamp.jsp?tp=&arnumber=663164> 10 Pages (99-108).*

Office Action to the corresponding Taiwan Patent Application rendered by Taiwan Intellectual Property Office (TIPO) on Apr. 17, 2015, 13 pages (including English translation).

* cited by examiner

TESTING DEVICE AND TESTING METHOD THEREOF

PRIORITY

This application claims the benefit of priority based on Taiwan Patent Application No. 102140949 filed on Nov. 12, 2013, which is hereby incorporated by reference in its entirety.

FIELD

The present invention relates to a testing device and a testing method thereof. More particularly, the testing device of the present invention can record actions generated by operating a terminal device, and record the executed coordinate command in the form of an object.

BACKGROUND

With the advancement of the science and technology, conventional mobile phones are being replaced gradually by intelligent mobile phones that provide better graphical user interfaces (GUIs) and diversified applications. To satisfy the demands for various users, manufacturers of intelligent mobile phones have released various intelligent mobile phones of different hardware specifications, especially of different touch screen sizes. In addition, GUIs and applications have also been widely used in various terminal devices such as intelligent mobile phones, tablet computers, intelligent television (TV) sets or the like.

To ensure that the GUIs (especially GUIs for specific applications in the operating systems) designed for terminal devices operate normally on the terminal devices of different hardware specifications (e.g., of different touch screen sizes) available in the market, the software providers must test operations of the applications on terminal devices of different hardware specifications. However, most of the current GUI testings are carried out manually, which is both labor- and time-consuming.

Although automatic testing techniques (e.g., the coordinate-based technique, the image-based technique, the object-based technique and the external hardware operation) have been proposed in the art, these techniques still have issues in some practical applications. For example, operation commands of the coordinate-based technique are easy to be composed, but when there is a change in the touch screen size or the resolution, the operation commands must be re-composed, as the result that specific operation command sets must be created for each types of terminal devices. Operation commands of the image-based technique can support comparison of images to improve the design flexibility, but the images recognition consumes a lot of resources. The object-based technique is capable of cross-platform testing, but which requires compiling of original objects and transformation of original program codes and also requires a specific authority in the operating system. Furthermore, the object-based technique cannot be used on different applications. Replacing the manual operations by external hardware operations will not cause a burden on the testing system, but represents a relatively high cost and requires rewriting the operation script files for different types of terminal devices respectively. Moreover, none of the current automatic testing techniques supports the physical button testing.

Accordingly, there is an urgent need existed in the art to provide a testing mechanism that generates a testing script through operations of terminal devices, so that the operations of manually making complex settings, composing the script files, compiling the original objects and transforming the original program codes can be obviated, and the cross-platform testing and support of the physical button testing can be achieved.

SUMMARY

An objective of certain embodiments of the present invention includes providing a testing mechanism that generates a testing script by recording operations of terminal devices and taking the advantages of the coordinate-based technique and the object-based technique. In this way, the testing mechanism of the present invention can obviate the operations of manually making complex settings, composing the script files, compiling the original objects and transforming the original program codes, and is capable of cross-platform testing.

To achieve the aforesaid objectives, certain embodiments of the present invention include a testing device, which comprises a transceiver, a storage and a processor. The transceiver is connected to a terminal device. The terminal device runs a graphical user interface (GUI). The storage is configured to store a testing program. The processor is electrically connected to the transceiver and the storage, and is configured to run the testing program to start a recording procedure for executing the following steps of: detecting a plurality of actions generated in response to operations on the terminal device; detecting a foreground application of the GUI; reading a plurality of pieces of object information of the foreground application; determining that a first action of the actions is to execute a coordinate command, and recording an object property operation of the foreground application which corresponds to the coordinate command according to the object information; and determining that a second action of the actions is to execute a call command which switches the foreground application from a first program to a second program, and recording the call command. The processor is further configured to stop the recording procedure to generate and store a script file and a reference log file into the storage. The script file comprises the object property operation and the call command.

Furthermore, certain embodiments of the present invention further include a testing method for a testing device. The testing device comprises a transceiver, a storage and a processor. The processor is electrically connected with the transceiver and the storage. The transceiver is connected to a terminal device. The storage stores a testing program. The terminal device runs a GUI. The testing method is executed by the processor and comprises the following steps of: (a) running the testing program to start a recording procedure; (b) detecting a plurality of actions generated in response to operations on the terminal device; (c) detecting a foreground application of the GUI; (d) reading a plurality of pieces of object information of the foreground application; (e) determining that a first action of the actions is to execute a coordinate command, and recording an object property operation of the foreground application which corresponds to the coordinate command according to the object information; (f) determining that a second action of the actions is to execute a call command which switches the foreground application from a first program to a second program, and recording the call command; and (g) stopping the recording procedure to generate and store a script file and a reference log file into the storage, wherein the script file comprises the object property operation and the call command.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. It should be appreciated that, these example embodiments are not intended to limit the present invention to any specific examples, embodiments, environment, applications or particular implementations described in these example embodiments. Therefore, description of these embodiments is only for purpose of illustration rather than to limit the present invention, and the scope of this application shall be governed by the claims. In addition, in the following embodiments and the attached drawings, elements unrelated to the present invention are omitted from depiction; and dimensional relationships among individual elements in the following attached drawings are illustrated only for ease of understanding, but not to limit the actual scale.

Figure 1:
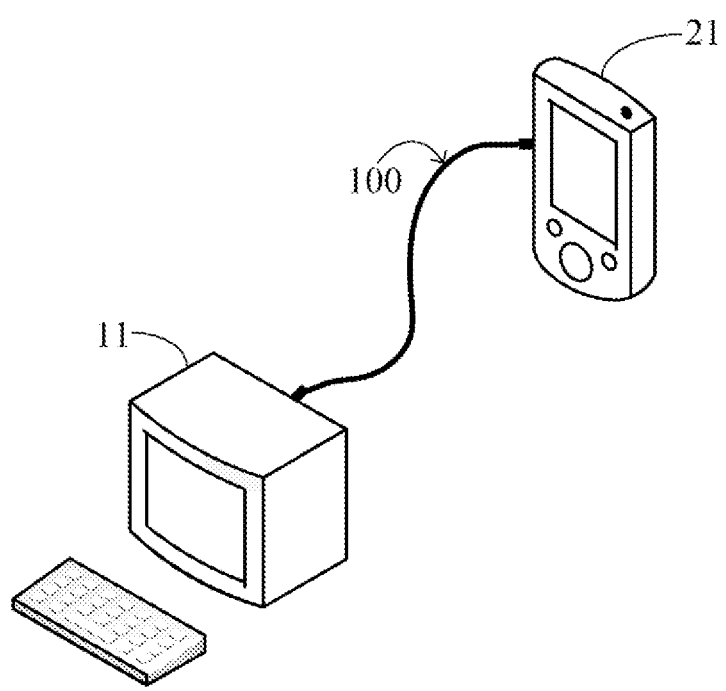
FIG. 1 is a schematic view of a first embodiment and a third embodiment of the present invention, which illustrates a testing device 11 connected to a terminal device 21.

The first embodiment of the present invention is shown in FIG. 1, which illustrates a testing device 11 connected to a terminal device 21. In this embodiment, the testing device 11 is connected to the terminal device 21 through a transmission line 100. However, in other embodiments, the testing device 11 may also be connected to the terminal device 21 in a wireless way, for example, by means of a near-end wireless technology (e.g., WiFi, Bluetooth or the like). The terminal device 21, which may be an intelligent mobile phone, a tablet computer, a pair of intelligent glasses, an intelligent watch, an intelligent television or the like, is mainly configured to run a GUI. The GUI belongs to an open source operating system (e.g., an Android operating system) and is configured to enable a user to operate the functions and applications in the operating system by operating the touch screen.

In this embodiment, it is assumed that the terminal device 21 can normally run the GUI as confirmed by manual operations or conventional automatic testing technologies. Thus, the present invention can create a testing script file by recording operations of the terminal device 21, and then apply the testing script file to a to-be-tested terminal device for purpose of testing the GUI and operations of the physical button. The following descriptions illustrate how to create a script file which is capable of cross-platform testing.

The testing device 11 of the present invention comprises a transceiver 111, a processor 113 and a storage 115. The transceiver 111 may be a connector having an interface (e.g., a Universal Serial Bus (USB) interface or a particular access interface) so that it can be connected to the terminal device 21 by receiving the transmission line 100 into the interface thereof; or the transceiver 111 may be a wireless transmitter adapted to be connected to the terminal device 21 by means of a near-end wireless technology. In addition, the transceiver 111 may also comprise both the connector and the wireless transmitter so as to be connected to the terminal device 21 in either way. The storage 115 stores a testing program. The storage 115 may be a tangible machine-readable medium or a combination of multiple tangible machine-readable media for providing the testing device 11 with a permanent storage, such as a flash memory, a hard disk, or any other storage media with the same function and well known to those skilled in the art. Accordingly, the testing device 11 may be a computer host, a workbench, a tablet computer or any device comprising a transceiver, a storage and a processor.

The processor 113 is electrically connected to the transceiver 111 and the storage 115. By operating the testing device 11, an operator enables the processor 113 to run the testing program and start a recording procedure. In this recording procedure, the processor 113 detects a plurality of actions generated in response to operations on the terminal device 21, and detects a foreground application of the GUI. Thereafter, the processor 113 reads a plurality of pieces of object information of the foreground application. It should be appreciated that, how to obtain the object information of the application from the open source operating system is well known to those skilled in the art, so this will not be further described herein.

Next, the processor 113 further determines that a first action of the actions is to execute a coordinate command and records an object property operation (e.g., Press Button 1, Input 'ABC' to EditText 1) of the foreground application which corresponds to the coordinate command according to the object information. The coordinate command of the present invention is executed for activating an object located at the coordinate (x,y) in the application. Specifically, when the terminal device 21 comprises a touch screen, the coordinate command can be executed in response to an operation on the touch screen of the terminal device 21. Additionally, when the terminal device 21 comprises an image capturing module, the coordinate command can also be executed in response to capturing of an image by the image capturing module. For example, the capturing module continuously captures pictures comprising the eyeballs of the user so that movement of the eyeballs can be analyzed to generate the coordinate command.

The processor 113 further determines that a second action of the actions is to execute a call command (i.e., an external call program instruction) which switches the foreground application from a first program to a second program, and records the call command. Then, by operating the testing device 11, the operator enables the processor 113 to stop the recording procedure to generate and store a script file 102 and a reference log file 104 into the storage 115. The script file 102 comprises the object property operation and the call command. The reference log file 104 is used for recording the results generated by executing the coordinate command and the call command.

Figure 3:
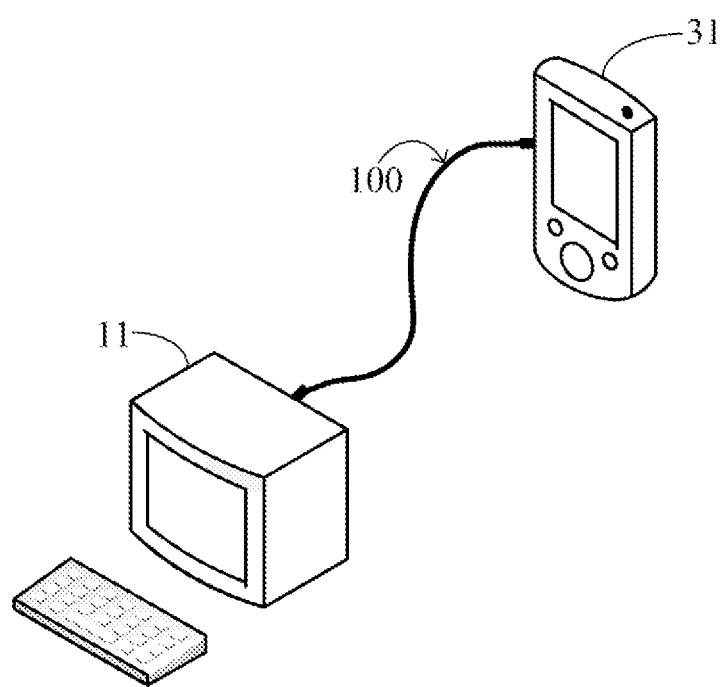
FIG. 3 is a schematic view of a second embodiment and a fourth embodiment of the present invention, which illustrates a testing device 11 connected to a terminal device 31.

A second embodiment of the present invention is shown in FIG. 3, which illustrates a testing device 11 connected to a terminal device 31. The transceiver 111 is disconnected from the terminal device 21 and connected to the terminal 31 through operations of the operator. Similarly in this embodiment, the terminal device 31 is connected to the terminal device 31 through a transmission line 100. However, in other embodiments, the testing device 11 may also be connected to the terminal device 31 by means of a near-end wireless technology.

The terminal device 31 runs a GUI that belongs to the same open source operating system as the terminal device 21 and displays the GUI on the touch screen thereof. In this embodiment, the screen (or the touch screen) of the terminal device 31 has a size different from the screen (or the touch screen) of the terminal device 21. In this case, by operating the testing device 11, the operator enables the processor 113 to run the testing program to start a playback procedure for testing the terminal device 31. It should be appreciated that, for purpose of simplicity, the testing program is still run by the testing device 11 in this embodiment. However, as will be appreciated by those of ordinary skill in the art, the terminal device 31 can also be tested by other devices with the same functions (that is, connecting with the terminal device 31, storing the testing program, the script file 102 and the reference log file 104, and running the testing program) as the testing device 11, and this will not be further described herein.

In this recording procedure, the processor 113 reads the previously created script file 102 from the storage 115. Then, the processor 113 analyzes the script file 102 and reads the object information of the foreground application of the GUI run by the terminal device 31. Thereafter, the processor 113 generates the coordinate command according to the object information and the object property operation recorded in the script file 102. Thus, by enabling the processor 113 to execute the call command in the script file 102 and the coordinate command obtained through conversion from the object property operation, the actions generated by previously operating the terminal device 21 can be performed by the terminal device 31. Meanwhile, the processor 113 generates a testing log file 106 in response to execution of these actions by the terminal device 31. Then, the processor 113 can generate a testing result by comparing the reference log file 104 with the testing log file 106 to obtain the difference between the reference log file 104 and the testing log file 106. The difference just represents abnormalities of the terminal device 31 during its running of the GUI.

Figure 2:
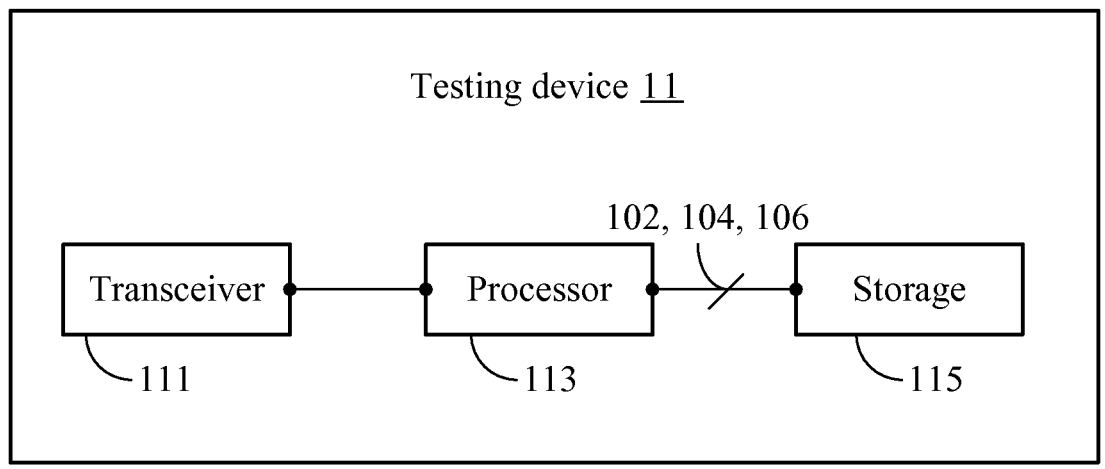
FIG. 2 is a schematic view of the testing device 11 of the present invention.

A third embodiment of the present invention is also shown in FIG. 1 and FIG. 2. Unlike the first embodiment, the terminal device 21 of this embodiment further comprises at least one physical button or a voice reception module, or comprises both the physical button and the voice reception module. In this case, the present invention can create a script file which is capable of cross-platform testing and supports physical button testing. Specifically, when the processor 113 runs the testing program and starts a recording procedure, the processor 113 further determines that a third action of the actions is to execute a behavior command (e.g., /dev/input 1). The behavior command is executed in response to an operation on the physical button or reception of a speech input by the voice reception module, and is used to adjust the sound or turn on/off the screen. Furthermore, the terminal device 21 can also execute a call command to start a particular application in response to an operation on the physical button or reception of a speech input by the voice reception module.

Therefore, when the operator operates the testing device 11 to enable the processor 113 to stop the recording procedure to generate and store a script file 102 and a reference log file 104 into the storage 115, the script file 102 comprises the behavior command, the object property operation and the call command. The reference log file 104 is used for recording the results generated by executing the behavior command, the coordinate command and the call command.

It should be appreciated that, in the aforesaid embodiments, the plurality of actions generated by the operating system of the terminal device 21 are distinguished only by "a" first action, "a" second action and "a" third action; however, as will be readily appreciated by those of ordinary skill in the art, these actions may include one or more first actions, one or more second actions and one or more third actions. Therefore, the script file 102 actually comprises at least one or more behavior commands, one or more object property operations and one or more call commands.

A fourth embodiment of the present invention is shown in FIG. 3. Unlike the second embodiment, the script file 102 and the reference log file 104 of this embodiment are as described in the third embodiment. In this case, when the processor 113 runs the testing program to start a playback procedure for testing the terminal device 31, the processor 113 executes the behavior command and the call command in the script file 102 and the coordinate command obtained through conversion from the object property operation so that the terminal device 31 can perform the actions generated by previously operating the terminal device 21. Thereafter, the processor 113 generates a testing log file 106 and generates a testing result by comparing the reference log file 104 with the testing log file 106 to obtain the difference between the reference log file 104 and the testing log file 106. The difference just represents abnormalities of the terminal device 31 during its running of the GUI.

Figure 4:
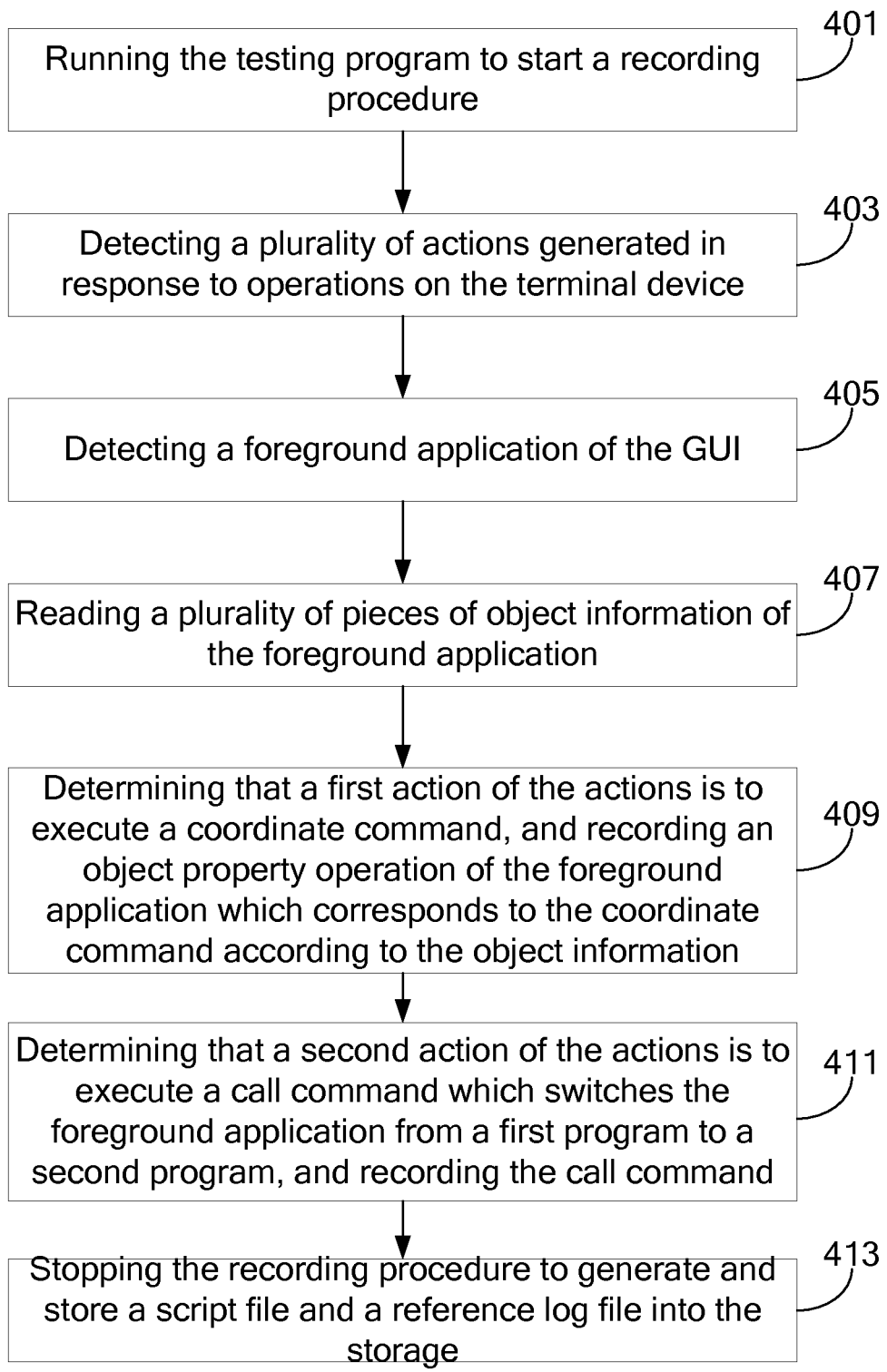
FIG. 4 is a flowchart diagram of a testing method according to a fifth embodiment.

A fifth embodiment of the present invention is a testing method for a testing device, a flowchart diagram of which is illustrated in FIG. 4. The testing method of the present invention is executed by a processor of the testing device (e.g., the processor 113 of the testing device 11 set forth in the aforesaid embodiments). In addition to the processor, the testing device also comprises a transceiver and a storage. The processor is electrically connected to the transceiver and the storage. The transceiver is connected to a terminal device. The storage stores a testing program. The terminal device runs a GUI.

Firstly, step 401 is executed to run the testing program to start a recording procedure. Next, step 403 is executed to detect a plurality of actions generated in response to operations on the terminal device. Step 405 is executed to detect a foreground application of the GUI. Step 407 is executed to read a plurality of pieces of object information of the foreground application.

Thereafter, step 409 is executed to determine that a first action of the actions is to execute a coordinate command, and record an object property operation of the foreground application which corresponds to the coordinate command according to the object information. Step 411 is executed to determine that a second action of the actions is to execute a call command which switches the foreground application from a first program to a second program, and record the call command. Finally, step 413 is executed to stop the recording procedure to generate and store a script file and a reference log file into the storage. The script file comprises the object property operation and the call command recorded in step 409 and step 411.

It should be appreciated that, as will be understood by those of ordinary skill in the art, the execution order of the step 409 and the step 411 is determined by the detected actions. In addition, the step 409, the step 411 and the step 413 will each be executed once or several times, with the total number of times being equal to the number of the detected actions.

In addition to the aforesaid steps, the testing method of this embodiment can also execute all the operations and functions set forth in the first embodiment. How this embodiment executes these operations and functions will be readily appreciated by those of ordinary skill in the art based on the explanation of the first embodiment, and thus will not be further described herein.

Figure 5:
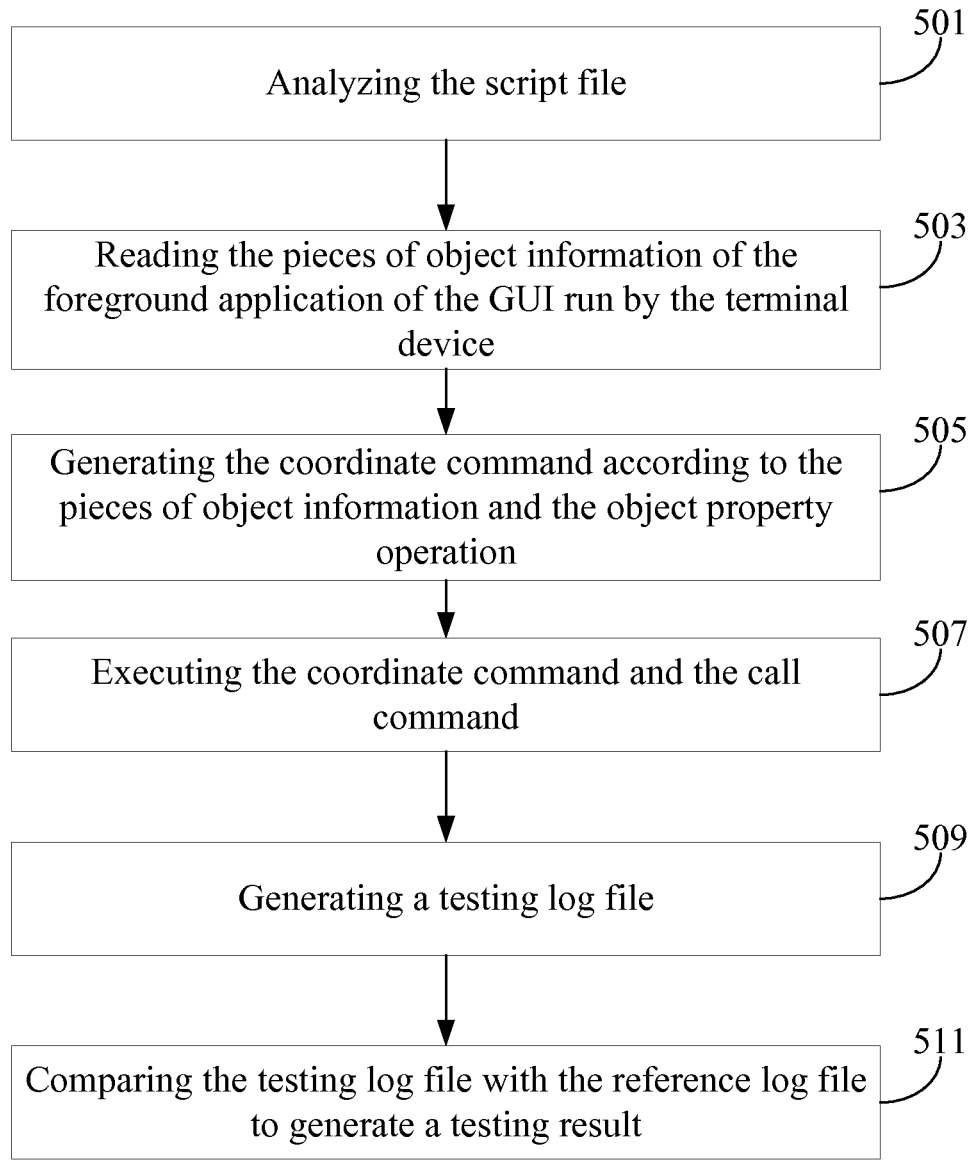
FIG. 5 is a flowchart diagram of a testing method according to a sixth embodiment.

A sixth embodiment of the present invention is a testing method for a testing device, a flowchart diagram of which is illustrated in FIG. 5. The testing method of the present invention is executed by a processor of the testing device (e.g., the processor 113 of the testing device 11 set forth in the aforesaid embodiments). In addition to the processor, the testing device also comprises a transceiver and a storage. The processor is electrically connected to the transceiver and the storage. The transceiver is connected to a terminal device. The storage stores the testing program, the script file and the reference log file as described in the fifth embodiment. The terminal device runs a GUI.

Firstly, step 501 is executed to analyze the script file. The script file comprises the object property operation and the call command. Step 503 is executed to read a plurality of pieces of object information of the foreground application of the GUI run by the terminal device. Step 505 is executed to generate a coordinate command according to the pieces of object information and the object property operation. Next, step 507 is executed to execute the coordinate command and the call command. Then, step 509 is executed to generate a testing log file. Finally, step 511 is executed to compare the testing log file with the reference log file to generate a testing result.

In addition to the aforesaid steps, the testing method of this embodiment can also execute all the operations and functions set forth in the second embodiment. How this embodiment executes these operations and functions will be readily appreciated by those of ordinary skill in the art based on the explanation of the second embodiment, and thus will not be further described herein.

Figure 6:
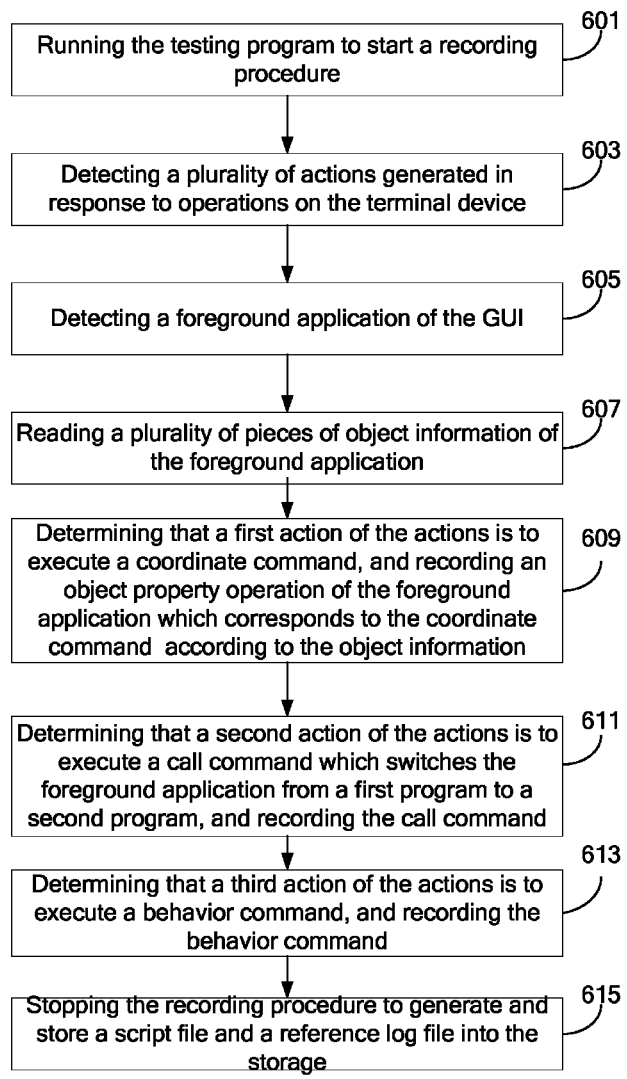
FIG. 6 is a flowchart diagram of a testing method according to a seventh embodiment.

A seventh embodiment of the present invention is a testing method for a testing device, a flowchart diagram of which is illustrated in FIG. 6. The testing method of the present invention is executed by a processor of the testing device (e.g., the processor 113 of the testing device 11 set forth in the aforesaid embodiments). In addition to the processor, the testing device also comprises a transceiver and a storage. The processor is electrically connected to the transceiver and the storage. The transceiver is connected to a terminal device. The storage stores a testing program. The terminal device runs a GUI.

Firstly, step 601 is executed to run the testing program to start a recording procedure. Next, step 603 is executed to detect a plurality of actions generated in response to operations on the terminal device. Step 605 is executed to detect a foreground application of the GUI. Step 607 is executed to read a plurality of pieces of object information of the foreground application.

Thereafter, step 609 is executed to determine that a first action of the actions is to execute a coordinate command, and record an object property operation of the foreground application which corresponds to the coordinate command according to the object information. Step 611 is executed to determine that a second action of the actions is to execute a call command which switches the foreground application from a first program to a second program, and record the call command. Step 613 is executed to determine that a third action of the actions is to execute a behavior command, and record the behavior command. Finally, step 615 is executed to stop the recording procedure to generate and store a script file and a reference log file into the storage.

The script file comprises the behavior command, the object property operation and the call command recorded in step 609, step 611 and step 613.

It should be appreciated that, as will be understood by those of ordinary skill in the art, the execution order of the step 609, the step 611 and the step 613 is determined by the detected actions. In addition, the step 609, the step 611 and the step 613 will each be executed once or several times, with the total number of times being equal to the number of the detected actions.

In addition to the aforesaid steps, the testing method of this embodiment can also execute all the operations and functions set forth in the third embodiment. How this embodiment executes these operations and functions will be readily appreciated by those of ordinary skill in the art based on the explanation of the third embodiment, and thus will not be further described herein.

Figure 7:
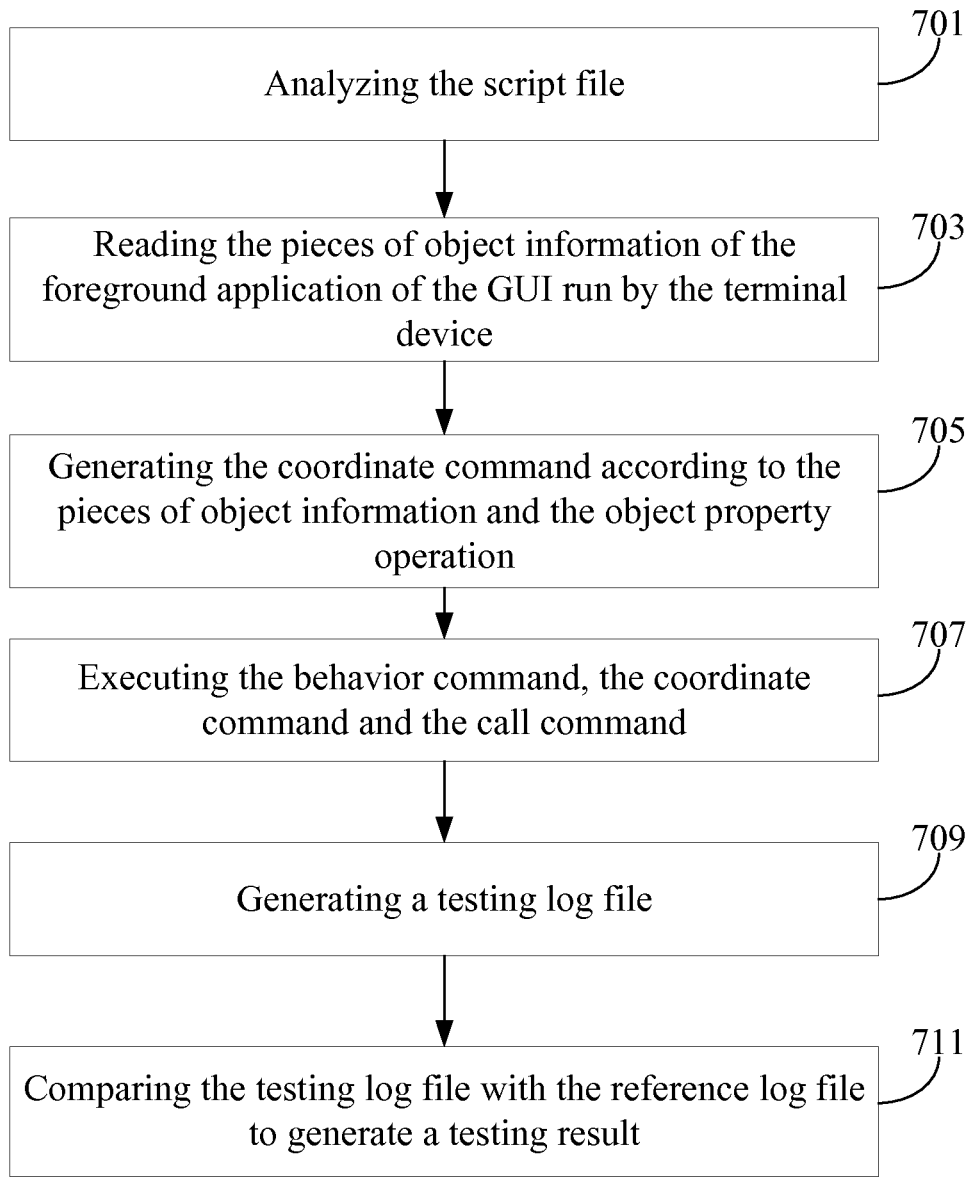
FIG. 7 is a flowchart diagram of a testing method according to an eighth embodiment.

An eighth embodiment of the present invention is a testing method for a testing device, a flowchart diagram of which is illustrated in FIG. 7. The testing method of the present invention is executed by a processor of the testing device (e.g., the processor 113 of the testing device 11 set forth in the aforesaid embodiments). In addition to the processor, the testing device also comprises a transceiver and a storage. The processor is electrically connected to the transceiver and the storage. The transceiver is connected to a terminal device. The storage stores the testing program, the script file and the reference log file as described in the seventh embodiment. The terminal device runs a GUI.

Firstly, step 701 is executed to analyze the script file. The script file comprises the behavior command, the object property operation and the call command. Step 703 is executed to read a plurality of pieces of object information of the foreground application of the GUI run by the terminal device. Step 705 is executed to generate a coordinate command according to the pieces of object information and the object property operation. Next, step 707 is executed to execute the behavior command, the coordinate command and the call command. Then, step 709 is executed to generate a testing log file. Finally, step 711 is executed to compare the testing log file with the reference log file to generate a testing result.

In addition to the aforesaid steps, the testing method of this embodiment can also execute all the operations and functions set forth in the fourth embodiment. How this embodiment executes these operations and functions will be readily appreciated by those of ordinary skill in the art based on the explanation of the fourth embodiment, and thus will not be further described herein.

According to the above descriptions, the present invention provides a testing mechanism, which records operations of the terminal device and, for operations corresponding to the coordinate command, records the object property operation to generate a testing script and a reference log file. Thereafter, when another intelligent mobile phone is tested according to the testing script, the testing mechanism of the present invention converts the object property operation into the coordinate command and compares the generated testing log file with the reference log file to find abnormalities of the tested terminal device during its running of the GUI. Thereby, not only the operations of manually making complex settings, composing the description files, compiling the original objects and transforming the original program codes of the testing mechanism may be obviated, and but also the cross-platform testing and with support of the physical button testing mechanism may be provided according to disclosure of the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A testing device, comprising:
a transceiver connected to a terminal device, being configured to run a graphical user interface (GUI);
a storage, being configured to store a testing program; and
a processor electrically connected to the transceiver and the storage, being configured to run the testing program to start a recording procedure for executing the following steps of:
detecting a plurality of actions generated in response to operations on the terminal device;
detecting a foreground application of the GUI;
reading a plurality of pieces of object information of the foreground application;
determining that a first action of the actions is to execute a coordinate command, and recording an object property operation of the foreground application which corresponds to the coordinate command according to the object information; and
determining that a second action of the actions is to execute a call command which switches the foreground application from a first program to a second program, and recording the call command;
wherein the processor is further configured to stop the recording procedure to generate and store a script file and a reference log file into the storage, and the script file comprises the object property operation and the call command;
wherein when the transceiver is disconnected from the terminal device and connected to another terminal device, the processor further runs the testing program to start a playback procedure for executing the following steps:
analyzing the script file;
reading the pieces of object information of the foreground application of another GUI run by the another terminal device;
generating the coordinate command according to the pieces of object information and the object property operation;
executing the coordinate command and the call command;
generating a testing log file; and
comparing the reference log file with the testing log file to generate a testing result.

2. The testing device as claimed in claim 1, wherein the terminal device further comprises a touch screen on which the GUI is displayed, and the coordinate command is executed in response to an operation on the touch screen.

3. The testing device as claimed in claim 1, wherein the terminal device further comprises an image capturing module, and the coordinate command is executed in response to capturing of an image by the image capturing module.

4. The testing device as claimed in claim 1, wherein the GUI and the another GUI belong to an open source operating system.

5. The testing device as claimed in claim 1, wherein a screen of the terminal device has a size different from a screen of the another terminal device.

6. The testing device as claimed in claim 1, wherein the terminal device further comprises at least one physical button or a voice reception module, and the processor further executes the following steps after the recording procedure is started:
determining that a third action of the actions is to execute a behavior command, and recording the action command, wherein the behavior command is executed in response to an operation on the at least one physical button or reception of a speech input by the reception module, and the script file further comprises the behavior command.

7. The testing device as claimed in claim 6, wherein when the transceiver is disconnected from the terminal device and connected to the another terminal device, the processor further runs the testing program to start the playback procedure for executing the following steps:
analyzing the script file;
reading the object information of the foreground application of the another GUI run by the another terminal device;
generating the coordinate command according to the pieces of object information and the object property operation;
executing the behavior command, the coordinate command and the call command;
generating the testing log file; and
comparing the reference log file with the testing log file to generate the testing result.

8. A testing method for a testing device, the testing device comprising a transceiver, a storage and a processor, the processor being electrically connected with the transceiver and the storage, the transceiver being connected to a terminal device, the storage storing a testing program, the terminal device running a graphical user interface (GUI), and the testing method being executed by the processor and comprising the following steps of:
(a) running the testing program to start a recording procedure;
(b) detecting a plurality of actions generated in response to operations on the terminal device;
(c) detecting a foreground application of the GUI;
(d) reading a plurality of pieces of object information of the foreground application;
(e) determining that a first action of the actions is to execute a coordinate command, and recording an object property operation of the foreground application which corresponds to the coordinate command according to the object information;
(f) determining that a second action of the actions is to execute a call command which switches the foreground application from a first program to a second program, and recording the call command;
(g) stopping the recording procedure to generate and store a script file and a reference log file into the storage, wherein the script file comprises the object property operation and the call command;
wherein when the transceiver is disconnected from the terminal device and connected to another terminal device, the method further comprises the following steps of:
executing the testing program to start a playback procedure;
analyzing the script file;

reading the pieces of object information of the foreground application of another GUI run by the another terminal device;
generating the coordinate command according to the pieces of object information and the object property operation;
executing the coordinate command and the call command;
generating a testing log file; and
comparing the reference log file with the testing log file to generate a testing result.

9. The testing method as claimed in claim 8, wherein the terminal device further comprises a touch screen on which the GUI is displayed, and the coordinate command is executed in response to an operation on the touch screen.

10. The testing method as claimed in claim 8, wherein the terminal device further comprises an image capturing module, and the coordinate command is executed in response to capturing of an image by the image capturing module.

11. The testing method as claimed in claim 8, wherein the GUI and the another GUI belong to an open source operating system.

12. The testing method as claimed in claim 8, wherein a screen of the terminal device has a size different from a screen of the another terminal device.

13. The testing method as claimed in claim 8, wherein the terminal device further comprises at least one physical button or a voice reception module, and the method further comprises the following step before the step (g):
(e) determining that a third action of the actions is to execute a behavior command, and recording the behavior command, wherein the behavior command is executed in response to an operation on the at least one physical button or reception of a speech input by the reception module, and the script file further comprises the behavior command.

14. The testing method as claimed in claim 13, wherein when the transceiver is disconnected from the terminal device and connected to the another terminal device, the method further comprises the following steps of:
executing the testing program to start the playback procedure;
analyzing the script file;
reading the pieces of object information of the foreground application of the another GUI run by the another terminal device;
generating the coordinate command according to the pieces of object information and the object property operation;
executing the behavior command, the coordinate command and the call command;
generating the testing log file; and
comparing the reference log file with the testing log file to generate the testing result.

* * * * *